Dec. 6, 1966    J. H. AUER, JR    3,290,490
METHOD AND APPARATUS FOR OBTAINING
TRAFFIC FLOW VELOCITY DATA
Original Filed May 1, 1961    3 Sheets-Sheet 1
FIG. IA.
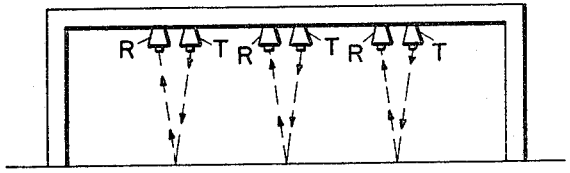
FIG. IB.
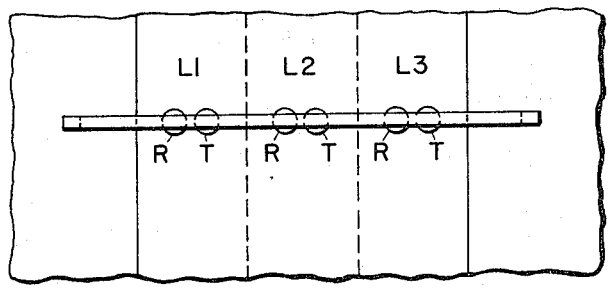
FIG. 2.
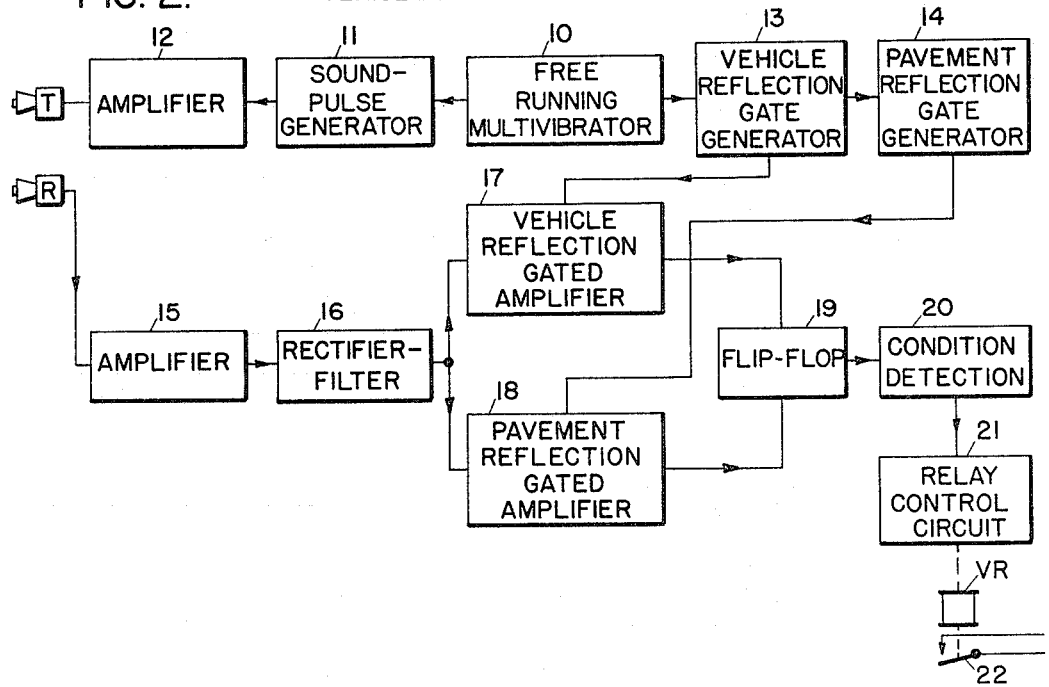
INVENTOR.
J.H. AUER JR.
BY
HIS ATTORNEY Dec. 6, 1966  J. H. AUER, JR  3,290,490
METHOD AND APPARATUS FOR OBTAINING
TRAFFIC FLOW VELOCITY DATA
Original Filed May 1, 1961  3 Sheets-Sheet 2
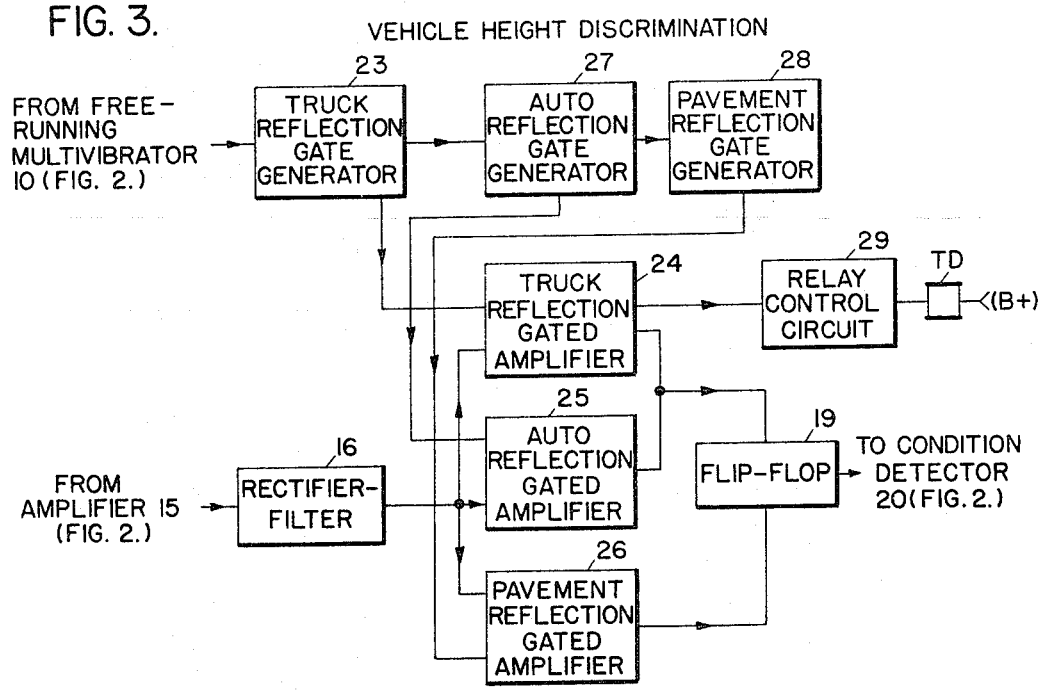
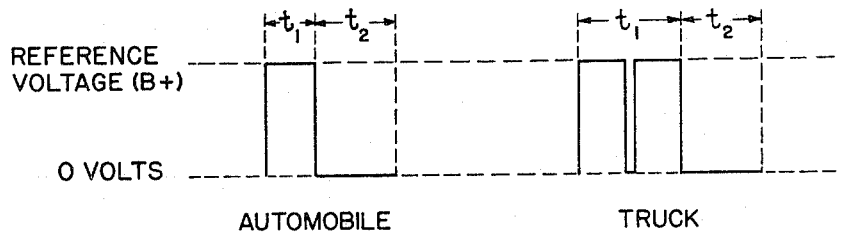
INVENTOR.
J.H. AUER JR.
BY
HIS ATTORNEY Dec. 6, 1966  J. H. AUER, JR  3,290,490
METHOD AND APPARATUS FOR OBTAINING
TRAFFIC FLOW VELOCITY DATA
Original Filed May 1, 1961  3 Sheets-Sheet 3

INVENTOR.
J.H. AUER JR.
BY
Forest B. Hitchcock
HIS ATTORNEY

United States Patent Office 3,290,490
Patented Dec. 6, 1966

3,290,490
METHOD AND APPARATUS FOR OBTAINING TRAFFIC FLOW VELOCITY DATA
John H. Auer, Jr., Fairport, N.Y., assignor to General Signal Corporation, a corporation of New York
Continuation of application Ser. No. 301,941, Aug. 9, 1963, which is a continuation of application Ser. No. 106,935, May 1, 1961. This application Feb. 21, 1966, Ser. No. 540,116
28 Claims. (Cl. 235—150.24)

This is a continuation of my prior co-pending application Ser. No. 301,941, filed August 9, 1963, which has been abandoned in favor of this application, which was in turn, a continuation of my prior application Ser No. 106,935, filed May 1, 1961 which has been abandoned in favor of the application Ser. No. 301,941, filed August 9, 1963.

This invention relates to a method and apparatus for automatically obtaining traffic information to facilitate the study of traffic conditions and thereby make possible the control of such traffic, and particularly relates to a method and apparatus for determining vehicle velocity and especially a factor which we designate as "flow velocity."

Analysis of traffic conditions on highways, bridges, and through tunnels leads to the conclusion that it is vital to have up-to-the-minute information on a number of different factors which, taken together, are capable of indicating when traffic conditions are approaching certain maximums. With this information, it is possible to take remedial steps such as by diverting traffic away from a clogged artery or by temporarily halting the flow of vehicles about to enter a tunnel. It has been found in actual practice that the availability of this information and its use in slowing the rate at which vehicles enter a tunnel, for example, can result in a substantial increase in the total number of vehicles that may use that tunnel within a given span of time. The consequence of this is that such facilities are used much more efficiently, and this makes it possible at times to delay or even eliminate the building of additional facilities with consequent large capital savings.

The method and apparatus for the study of traffic conditions of the present invention is concerned particularly with providing a measure of velocity and especially "flow velocity." This latter factor is somewhat akin to average velocity and is important since it provides an approximation as to the velocity of traffic flow past a given point. As will be shown, this factor is representative of the entire stream of traffic flowing past a given detection location rather than giving a true measurement of the velocity of each individual vehicle.

Described briefly, the present invention is based upon the use of apparatus which provides an output analog whose duration is proportional, for each vehicle, to the length of time that it takes that vehicle to pass a given detection point. The vehicle detection means providing this data may thus be termed a "presence" detector in that is provides a distinctive output signal whose duration corresponds to the length of time required for the vehicles to pass the point, as opposed to other known types of detectors which provide an output that is the same for each vehicle and is independent of the time required for the vehicle to pass the detection point.

The desired traffic flow velocity data can, of course, be provided by using apparatus specifically provided for this purpose, such as Doppler speed measuring apparatus. It is, however, desirable to obtain this flow velocity data without having to utilize such additional speed measuring equipment and instead to obtain such data through use of the aforementioned vehicle presence detector which is ordinarily required to be used in any event for the counting of individual vehicles. The output of the vehicle presence detector comprises a signal which is present throughout the time that it takes for the vehicle to pass the detection point. Assuming that it is possible to obtain data for each vehicle which represent vehicle length, there can then be made available corresponding analogs whose amplitudes are respectively proportional to the time taken by the vehicle to pass the detection point and to vehicle length. Division of these two analogs then provides an analog whose amplitude gives an approximate measure of vehicle speed since velocity=length/time. This method of obtaining flow velocity data and also apparatus for practicing this method are disclosed and claimed in the prior application of H. C. Kendall and J. H. Auer, Serial No. 78,410, filed December 27, 1960, now Patent No. 3,233,084, issued February 1, 1966.

According to the present invention, an alternative method of measuring vehicle flow velocity is disclosed along with apparatus capable of practicing the novel method. Essentially, the method comprises the steps of generating an analog for each passing vehicle whose total duration is proportional to the length of time required for the vehicle to pass a given point, controlling the amplitude of such analog so that it is a first predetermined higher value for a time which is variable in accordance with vehicle length and at a second predetermined lower value for the remainder of its duration, and then measuring the average value of the resulting analog to provide thereby a measure of vehicle speed. It will be demonstrated mathematically that the average value of the amplitude of the analog generated with these characteristics is closely proportional to the velocity of the vehicle.

The analog signal just described may be of any desired nature, but it has been found desirable in practice to employ an electrical voltage whose normal amplitude may be zero but which rises to a selected reference value for an interval which is variable in accordance with vehicle length as already described. When the factor of vehicle length is determined quite accurately for each individual vehicle, then the average value of amplitude of the analog produced for each vehicle closely approximates the particular speed of that vehicle.

As previously mentioned, the present invention has particular utility in the measurement of "flow velocity" and it is then not necessary that vehicle length be measured for individual cars since it can safely be assumed that each of a stream of successive vehicles will be of a particular average length. When this is done, the velocity measurement from any one vehicle may be in error to a degree dependent upon how its length varies from the average length of such vehicles but for a relatively large sampling of vehicle, data of adequate accuracy can be obtained. In a situation when all, or a substantial majority, of the monitored vehicles are automobiles, only one average length value need be taken into account, and the analog may be caused to stay at the predetermined upper value for any convenient interval provided only that its duration does not exceed the minimum time required for a high speed vehicle to pass the detection location. The speed data thus obtained is greatly in error when an appreciable portion of the traffic constitutes vehicles whose length varies substantially from the assumed average length. It thus becomes desirable to detect separately those vehicles, such as trucks, or other vehicles, whose average length greatly exceeds the average length of automobiles. It then becomes possible to control the generation of the analog so that the length of time during which it is at the higher value will be greater to thereby reflect the greater assumed average length of trucks.

When this is done, the accuracy of measurement is considerably improved.

As long as vehicle length is not measured quite accurately for each vehicle, however, any one measurement may still be in error. It is, therefore, desirable that each measurement of the average amplitude of an analog for a particular vehicle be able to affect the ultimate output measurement to only a limited degree. This is accomplished in the present invention by providing a voltage averaging circuit having a considerable electrical "inertia."

Therefore, it is an object of the invention to provide traffic data apparatus which will continuously indicate the flow velocity of traffic passing a fixed detection location.

It is a further object of this invention to disclose a method whereby the flow velocity of traffic passing a fixed point may be determined.

Other objects, purposes, and characteristic features of this invention will in part be obvious from the accompanying drawings and in part pointed out as the description of the invention progresses.

To simplify the illustration, the various parts and circuits constituting the various embodiments of the invention are shown diagrammatically and certain conventional circuits and elements are illustrated in block form. The symbols (B+) and (B−) represent sources of voltage of positive and negative polarity, respectively, with a symbol for a ground connection indicating an intermediate tap between the positive and negative terminals. In describing the invention in detail, reference will be made to the accompanying drawings in which like reference characters designate corresponding parts throughout the several views and in which:

FIGS. 1A and 1B illustrate a possible arrangement of vehicle detection apparatus over the adjacent lanes of a highway;

FIG. 2 illustrates in block form a vehicle detector of the "presence" detection type which may be used in connection with the apparatus of this invention;

FIG. 3 is a block diagram illustrating apparatus which may be used to obtain data as to vehicle length;

FIG. 5 illustrates typical voltage wave forms associated with the operation of the circuit of FIG. 4.

GENERAL DESCRIPTION

Figure 4:
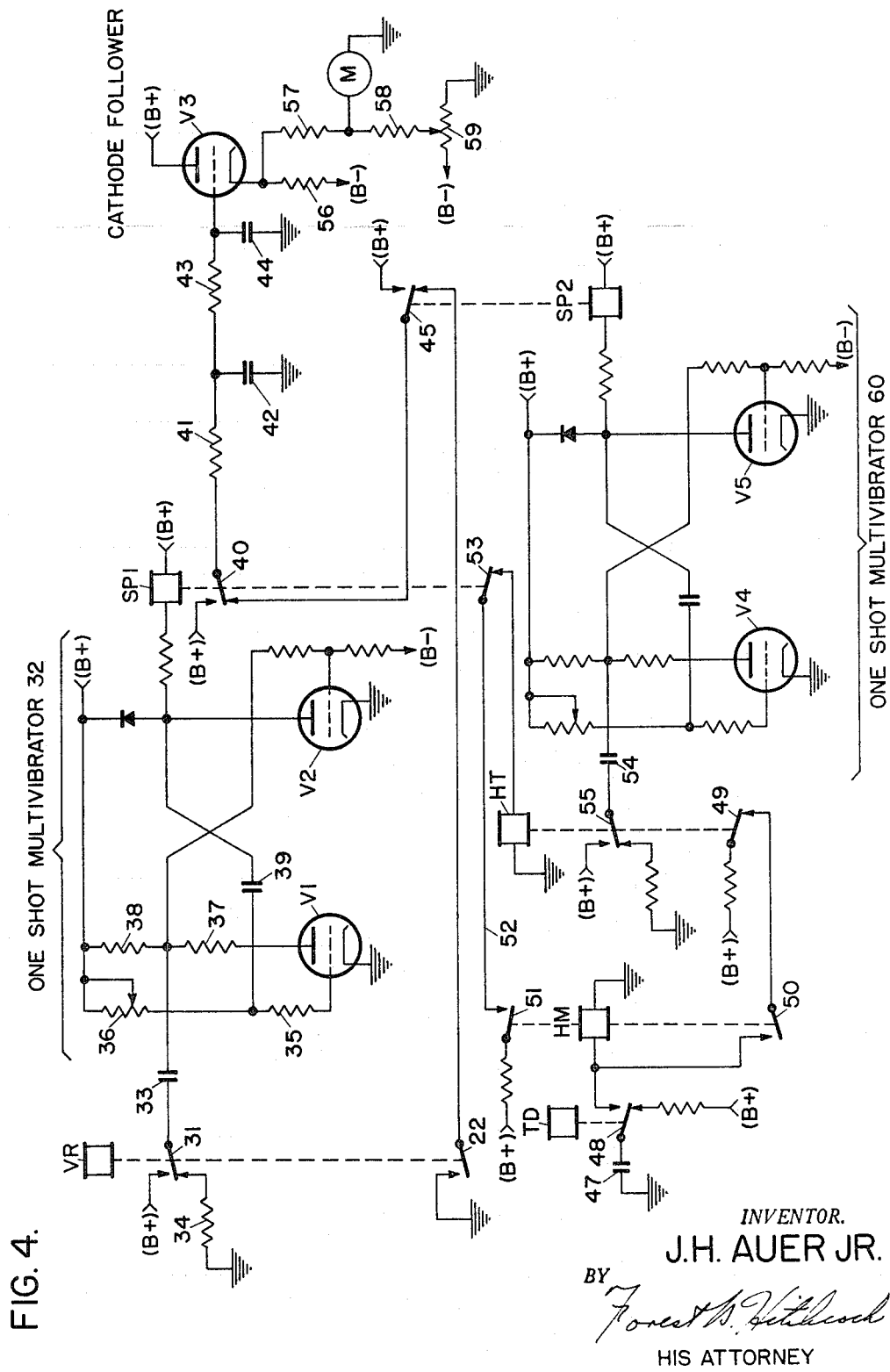
FIG. 4 is a circuit diagram of apparatus which provides flow velocity data.

It is deemed desirable to describe first what is meant by the term "flow velocity." Flow velocity is a measure of the level of speed at which successive vehicles pass a monitoring point. Flow velocity may be represented by a voltage whose amplitude is proportional to flow velocity and is a continuously variable quantity, being constantly available for measurement. The flow velocity figure can vary only slowly and thus is not appreciably affected if, in the stream of traffic being monitored, an occasional vehicle has its velocity differing substantially from that of the majority of vehicles. Of course, if a number of successive vehicles all move at a substantially higher speed, for example, then the quantity representing flow velocity will gradually change until finally it represents the higher speed of such vehicle. Under ordinary conditions, where vehicles pass in relatively rapid succession, the flow velocity measured is quite closely proportional to average vehicle velocity.

FIGS. 1A and 1B illustrate a possible arrangement of the vehicle detection apparatus, including the electroacoustic transducers which may be used for each of three parallel highway lanes when the vehicle detection apparatus is of the pulsed ultrasonic type. In a vehicle detection system of this type, which is disclosed in detail in the prior application of Kendall et al., Serial No. 808,736, filed April 24, 1959, now U.S. Patent No. 3,042,303, repetitive sound pulses, each of short duration such as one millisecond, are transmitted downwardly from a transmitting transducer T toward the pavement and impinge, in the absence of any vehicle, upon the surface of the roadway. They are then reflected back toward a receiving transducer R. When a vehicle intercepts the relatively narrow beam of sound pulses, the sound pulses can no longer impinge upon the pavement but then impinge upon the upper sound reflecting surfaces of the vehicle. Incidentally, the repetition rate of the pulses is sufficiently slow to provide enough time between successive pulses to permit each reflected pulse to be received by the receiving transducer before the next sound pulse is transmitted. This latter requirement eliminates ambiguity since each reflection pulse is then definitely related to the last-transmitted sound pulse.

The round-trip propagation time of a reflection pulse is affected considerably by whether or not there is a vehicle present within the sound beam. When no vehicle is present, each sound pulse has a maximum propagation time, but when a vehicle is present the propagation time is considerably reduced. This difference in propagation time makes it possible to distinguish between pavement and vehicle reflection pulses and thereby detect that a vehicle is within the sound beam. Since the detected condition persists as long as the vehicle occupies the sound beam, the duration of this condition represents the length of time required for a vehicle to pass the detection location defined by the sound beam.

VEHICLE PRESENCE DETECTOR—FIG. 2

In FIG. 2, the apparatus provided for generating the repetitive sound pulses comprises a free-running multivibrator 10 whose frequency of operation establishes the pulse repetition rate. For each cycle of its operation, the multivibrator 10 applies a triggering pulse to the sound pulse generator 11. The generator 11 then produces a brief pulse of ultrasonic frequency energy which is amplified by amplifier 12 and applied to the transmitting transducer T, thereby causing a corresponding sound pulse to be transmitted toward the pavement. Electronic gating circuits are employed and each demarcates a successive time interval, with the first of these being driven by multivibrator 10. The first of these gating circuits, the vehicle reflection gate generator 13, demarcates a time interval which encompasses that period of time after the transmission of each sound pulse when a vehicle reflection can be expected to be received. Another subsequent time interval is demarcated by the pavement reflection gate generator 14 and encompasses the interval of time during which a pavement reflection can be expected to be received.

The reflection pulses are all amplified by amplifier 15, and after being rectified and filtered by the rectifier-filter 16, are applied to both the vehicle reflection gated amplifier 17 and the pavement reflection gated amplifier 18. These two amplifiers are respectively gated by the voltage derived from the gate generators 13 and 14 previously referred to. As a result, when no vehicle is present, each reflected sound pulse results in a corresponding output from the pavement reflection gated amplifier 18, and this output is then applied to one input of flip-flop 19. When a vehicle is within the sound beam, each reflected sound pulse produces an output from the gated amplifier 17, and this is then applied to the other input of flip-flop 19.

As long as flip-flop 19 receives successive input pulses from amplifier 18, it remains in a first one of its two stable states. Therefore, it remains in such first state as long as no vehicle is within the sound beam. Flip-flop 19 is operated to its opposite state, however, when a vehicle is within the sound beam so that it receives successive input pulses from amplifier 17 instead of from amplifier 18.

Condition detector 20 is connected to flip-flop 19 and senses which of its two states flip-flop 19 is in at any time. Whenever condition detector 20 senses that flip-flop 19 is in the condition it assumes whenever it is constantly receiving output pulses from amplifier 18, it then acts upon relay control circuit 21 to cause relay VR to be dropped away so that front contact 22 of this relay is open. On the other hand, when condition detector 20 is in the opposite of its two states by reason of having sensed that flip-flop 19 is in the condition it necessarily assumes whenever it receives successive pulses from amplifier 17, then relay control circuit 21 is operated to the condition where relay VR is picked up. At such time, front contact 22 of relay VR is closed.

From this description, it can be seen that the vehicle detector described in FIG. 2 is of the type which is a "presence" detector in that relay VR is picked up throughout the time that a vehicle is detected as being within the sound beam. The various component values affecting the time constants associated with this detector are so chosen that the response and release times for relay VR will be substantially identical. This is done so that the picked up time of relay VR will tend to be closely proportional to the length of time that the vehicle is within the sound beam.

Another distinctive characteristic of the vehicle detector of FIG. 2 is that it provides a high degree of discrimination against spurious objects. More specifically, in order for a vehicle to be detected, it is first necessary that the normally received pavement reflections be no longer received and that concurrently therewith vehicle reflection pulses be received. Before the apparatus can be restored to its normal condition so that it can thereafter detect a subsequent vehicle, it is necessary that the vehicle reflections cease and that the pavement reflection again be restored. These multiple requirements ensure that only a vehicle will ordinarily provide operation of the detector relay VR. Moreover, a convertible auto having sound reflecting surfaces only at its front and rear deck portions cannot possibly be counted as two separate vehicles, since the absence of pavement reflection pulses when the cloth top is within the sound beam prevents the detector relay from dropping away. These characteristics of the vehicle detector of FIG. 2 are fully set forth in the prior application of J. H. Auer, Jr., Serial No. 820,325, filed June 15, 1959, now U.S. Patent No. 3,045,909 which may also be referred to for a more detailed description of the mode of operation of flip-flop 19, condition detector 20, and relay control circuit 21.

Although the vehicle detector of FIG. 2 is disclosed as being of the pulsed ultrasonic type, it is to be emphasized that it is by no means essential that a vehicle detector of this particular type be used to practice the present invention. It is only necessary that the detector be generally of the type which will provide an output for each vehicle whose duration is proportional to the length of time that the vehicle requires to pass a given point.

FIG. 3 illustrates how the vehicle detector of FIG. 2 may be modified to provide a separate output indication for each high vehicle passing the detector location. By thus detecting the presence of a vehicle of greater height than usual within the detection zone, there is in effect also detected the fact that the vehicle is of longer than ordinary length since automobiles are generally of quite low height while long trucks are generally considerably higher than automobiles.

In FIG. 3, the output of the free-running multivibrator 10 of FIG. 2 is applied to successive gating circuits. The first of these if the truck reflection gate generator 23 which produces a first gating voltage that encompasses the expected reception time of a truck reflection pulse. This gating voltage occurs relatively soon following the transmission of each sound pulse since the greater height of trucks causes a truck reflection to have a quite short round-trip propagation time. Another gate generator, referred to as the auto reflection gate generator 27, is provided and this generates another gating voltage which encompasses a somewhat later interval during which a reflection can be expected from the top of an automobile. This second gating voltage can be quite considerably delayed with respect to the truck reflection gating voltage because of the lower height of autos which causes the reflection pulse from such autos to have a considerably longer propagation time. The pavement reflection gate generator 28 generates the usual pavement gate which encompasses the expected time of reception of a pavement reflection pulse.

The output of amplifier 15 of FIG. 2 is applied to rectifier filter 16 and then in parallel to the inputs of the truck reflection gated amplifier 24, auto reflection gated amplifier 25, and a papement reflection gated amplifier 26. These gated amplifiers 24-26 are gated respectively by the truck reflection gate generator 23, auto reflection gate generator 27, and pavement reflection gate generator 28.

Whenever a truck passes the detector location, an output is obtained from amplifier 24 for each repetitive pulse transmitted and each such output is then applied to the relay control circuit 29. When a predetermined plurality of such inputs have been obtained, the relay control circuit 29 is operated to a distinctive condition wherein it causes relay TD to pick up. Each truck reflection pulse also causes an output pulse to be supplied by amplifier 24 to flip-flop 19.

The reception of a reflection pulse having a longer propagation time and indicating that it is reflected from the top of a passing automobile produces an output from amplifier 25. Similarly, when no vehicle at all is present, amplifier 26 produces an output pulse. The outputs of both amplifiers 24 and 25 are applied in parallel to one input of flip-flop 19. The output of amplifier 26 is applied to the other input of flip-flop 19. Thus, flip-flop 19 is operated in exactly the same manner as described in connection with FIG. 2. The occurrence of reflection pulses from either automobiles or trucks will cause the flip-flops to be operated to a particular one of its two distinctive stable states and it will remain in such state until it receives repetitive inputs from amplifier 26 indicating that a vehicle has passed and that the reflection pulses are now again being received from the pavement. The condition detector 20 is connected to the output of flip-flop 19 and is distinctively controlled according to the prevailing condition of flip-flop 19. The remainder of this circuit operates in a manner identical to that previously described for FIG. 2.

DESCRIPTION OF OPERATION OF FIG. 4

The circuit diagram of FIG. 4 illustrates the means by which the successive actuations of the relays VR and TD may be made to result in an energization of a meter M so that the meter will read the flow velocity of traffic in suitable units such as miles per hour.

A contact 31 of relay VR is shown as operating a one-shot multivibrator 32. Relay VR is normally dropped away as has been already described so that back contact 31 is closed and therefore the left-hand terminal of capacitor 33 is connected through resistor 34 to ground. Normally, multivibrator 32 rests in the condition where its tube V1 is fully codnuctive and tube V2 is cut off. The multivibrator assumes this condition because the control grid of tube V1 is connected through resistor 35 and through potentiometer 36 to the (B+) voltage terminal. Because of the conductive condition of tube V1, the voltage at the junction of the plate resistors for this tube, resistors 37 and 38, is at a relatively low potential so that capacitor 33 is substantially discharged.

As soon as front contact 31 of relay closes upon the entry of a vehicle into the detection zone, capacitor 33 is abruptly charged through this closed front contact 31 from the (B+) terminal so that the normally non-conductive tube V2 is turned on. This causes tube V1 to be instantaneously cut off and the multivibrator remains in this abnormal state for a predetermined length of time which is determined by the time constant for the discharge of capacitor 39 connected between the plate of tube V2 and the junction of grid resistors 35 and 36. The various circuit constants for multivibrator 32 are so chosen that it will remain in the abnormal state for a length of time that is less than the time of occupancy of the detection zone, even for a vehicle of short length and traveling at the maximum expected speed. The result is that the relay SP1, which is connected in the plate circuit of tube V2, is picked up very shortly after relay VR picks up, and this relay SP1 remains picked up for a fixed length of time which is the same regardless of the length of time that relay VR remains picked up.

During the time that relay SP1 is picked up, its front contact 40 is closed so that the (B+) voltage supply can be connected through this closed front contact to an averaging circuit which comprises a series resistor 41 and shunt capacitor 42 and also another series resistor 43 and further shunt capacitor 44, with the upper terminal of capacitor 44 being connected to the control grid of cathode follower tube V3. Therefore, capacitor 44 receives an increment of charge each time that relay VR picks up and the duration of each successive increment of charge thus received is of a uniform amount since front contact 40 remains closed for a predetermined length of time.

When relay SP1 drops away, back contact 40 closes and, assuming that the vehicle thus passing through the detection zone is an automobile so that the relay TD has not picked up, a circuit is then closed through back contact 40, through back contact 45 of relay SP2, and front contact 22 of relay VR, to ground. This last-described circuit permits capacitor 44 to discharge, and the amount of charge lost by capacitor 44 during this time is dependent upon how long front contact 22 remains closed subsequent to the dropping away of relay SP1 which closes back contact 40. When the vehicle departs from the detection zone so that relay VR is restored to its normal dropped away condition, front contact 22 of this relay opens so that the just-described discharging circuit for capacitor 44 is opened. Thereafter, capacitor 44 can neither charge nor discarge to any appreciable degree. As will subsequently be shown, the average value of the voltage that is applied to capacitor 44 during this successive charging and discharging is closely proportional to vehicle speed.

The wave-form diagram of FIG. 5 shows, in its left-hand portion, the stepped wave-form of voltage that is applied to the averaging circuit comprising capacitor 44 as the result of the passage of an automobile through the detection zone. Ordinarily, the integrating circuit is neither connected to (B+) nor to ground because of open front contacts 40, 45, and 22. However, as just described, when a vehicle passes through the detection zone, the reference voltage, which in this case is the (B+) voltage, is applied to the averaging circuit for a fixed length of time which is designated as $t_1$. The duration of $t_1$ is entirely dependent upon the operating time of the one-shot multivibrator 32 and upon the operating characteristics of the associated relay SP1. When relay SP1 drops away, the averaging circuit has its input connected to ground so that, in effect, zero volts are applied thereto for an interval $t_2$ whose duration is, of course, dependent upon both the length of the vehicle and its speed, since both these factors affect the time of occupancy of the detection zone and thus the time that relay VR remains picked up. For the present, only automobiles are being considered and it will be assumed that the length L of each vehicle equals the average length of all automobiles so that the sum of $t_1$ and $t_2$ will be proportional to the occupancy time of each successive auto.

At the end of time $t_2$, which corresponds to the restoration of relay VR and the opening of front contact 22, the zero voltage which has been applied to the averaging circuit is removed.

The average amplitude of the stepped wave of voltage that is thus produced and applied to the averaging circuit is thus equal to the reference voltage multiplied by the ratio of time $t_1$ to the sum of the two times $t_1 + t_2$ or:

$$E_{av} = E_{ref}\left(\frac{t_1}{t_1+t_2}\right)$$

where $E_{av}$ is the avearge value of the stepped voltage wave and $E_{ref}$ is the reference voltage which, in this case, is the (B+) supply. But $t_1$ is a constant, so that $t_1 = k_1$ where $k_1$ is a constant factor. Also, the sum of $t_1 + t_2$ is equal to the total occupancy time of the detection zone so that $t_1 + t_2 = T$ where T is the occupancy time. Consequently, the average voltage $$V_{av} = E_{ref}\left(\frac{k_1}{T}\right)$$

Of course, vehicle velocity $$S = \frac{L}{T}$$

and thus it is only necessary for $k_1$ to be proportional to L in order for $V_{av}$ to be porportional to S, or $$V_{av} = k_3 S$$

where $k_3$ is the calibration factor.

Under the assumed conditions where each vehicle has a length equal to the assumed average length, then $V_{av}$ is proportional to vehicle velocity. The constant $k_1$ may be chosen to have any suitable value provided that it is less than the minimum expected value of T. An output meter may be provided and its scale may be calibrated to read in terms of miles per hour, with this calibration being, of course, dependent on the particular value of $k_1$ that is selected. As previously mentioned, the system and method of this invention may be practiced with the assumption that all vehicles detected are of the same length. In that event, the constant $k_1$ may be a true constant in that it remains the same for all vehicles. Of course, if $V_{AV}$ is read by a meter and it is desired that the meter's reading express velocity in terms of miles per hour, for example, then the calibration factor $k_3$ may be selected, in accordance with whatever value of $k_1$ is used, to effect this result.

Of course, for vehicles whose length is different from the average assumed length, the relationship between $V_{av}$ and S does not hold true. Thus, in any random sampling of vehicles as will ordinarily occur in a stream of traffic, the length of any individual car may differ from the assumed average length, and to the extent that this occurs, $V_{av}$ will not be proportional to S. By causing the averaging circuit to have a relatively slow response term, the result obtained from an individual vehicle cannot vary the meter reading greatly and thus it tends to reflect the measurements obtained from a succession of vehicles and such meter reading will, of course, quite accurately represent the velocity of the traffic passing the detection location.

When conditions are such that an appreciable percentage of the passing vehicles have a length differing substantially from the assumed single value, the measured flow velocity becomes inaccurate. This is the situation that arises when the traffic includes an appreciable number of trucks, especially trailer trucks whose length is several times that of an automobile. It then becomes desirable to distinguish between trucks and other vehicles and to use a different value of $k_1$ for such trucks. If the new value of $k_1$ is designated as $k_t$ then $$\frac{k_T}{k_1} = \frac{L_T}{L_A}$$

where $L_T$ is the assumed average length of trucks and be apparent that various other types of apparatus may also be employed to obtain this desired result. It may also be considered that the broader aspects of this invention comprise a method whereby flow velocity is measured and that this method comprises a first step of generating an analog in response to each passing vehicle whose total duration is proportional to the length of time required for the vehicle to pass a given detection location, with said analog being at a predetermined upper level for a length of time which is variable in accordance with the length of the vehicle and which is at a predetermined lower level for the remainder of its duration, and then measuring the average level of the resulting signal thereby obtained.

It may also be considered that this invention, in its broader aspects, comprises the method of measuring flow velocity which includes measuring the time required for each vehicle to pass a given point; determining the length, at least on an average, of the vehicles passing the given point; adding algebraically, in response to each detected vehicle, to an existing manifestation of flow velocity an amount which is proportional to the difference between the length of the detected vehicle and the time integral of the existing flow velocity manifestation over the measured time of passage of the vehicle past the given point; and measuring the value of the flow velocity manifestation.

That this latter broad concept of the method of my invention embraces the more specific, previously-stated concept of measuring the average level of an analog having specified characteristics related to vehicle length and occupancy time can be understood from the following analysis:

In generating an analog signal for vehicle whose total duration is proportional to the length of time required for the vehicle to pass a given location and with said analog voltage being at a predetermined upper level for a length of time which is variable in accordance with the length of the vehicle and at a predetermined lower level for the remainder of its duration, and in supplying each such analog to an existing manifestation of flow velocity, it must necessarily follow that, under conditions of equilibrium, where the speed of a monitored vehicle equals the then-stored manifestation of flow velocity, the net change in the then-stored manifestation is zero. In other words, referring to FIG. 4, the amount of charge acquired by capacitor 42 in response to each vehicle detected equals the amount of charge lost under conditions of equilibrium and, accordingly, the following equation may be written:

(1) $\quad k_1(E_{REF}-E_{AV})t_1 - k_2 E_{AV} t_2 = 0$

If $k_1 = k_2$, (2) $\quad E_{REF} t_1 - E_{AV}(t_1 + t_2) = 0$

If $E_{REF} \, t_1 \, \alpha L$, where L equals average vehicle length, then (3) $\quad E_{AV} \alpha \dfrac{L}{T}$, where $T = t_1 + t_2$ As with the previous mathematical analysis, Equation 3 demonstrates how the apparatus of this invention which operates in accordance with Equation 1 provides a manifestation of flow velocity. However, Equation 2 above demonstrates that the disclosed apparatus, in effect, adds algebraically to the existing flow velocity manifestation an amount proportional to the difference between vehicle length and the time integral of the then-stored flow velocity manifestation over the occupancy time T.

From the foregoing description, it is evident that the broad concept of my invention also comprehends apparatus which comprises vehicle detector means for demarcating the occupancy time of each vehicle in a detection zone, means for providing a manifestation of vehicle length, storage means storing a signal representative of flow velocity, and means for algebraically adding to the then-stored flow velocity signal an amount in response to each detected vehicle which is proportional to the difference between the then-existing vehicle length manifestation and the time integral of the current flow velocity signal over the occupancy time interval, together with means which is responsive to the magnitude of the then-stored signal to indicate the value of flow velocity.

Having described a traffic flow velocity measuring means and the general mode thereof, we desire it to be understood that various adaptations and modifications may be made to the specific form shown without departing in any manner from the spirit or scope of our invention.

What I claim is:

1. The method of measuring vehicle velocity comprising the steps of, generating a stepped voltage waveform whose total duration is proportional to the length of time required for said vehicle to pass a given point and with said waveform being of a predetermined higher value for a length of time which is variable in proportion to the length of said vehicle and being of a predetermined lower value for the remainder of its said total duration, and measuring the average voltage value of said waveform.

2. The method of measuring vehicle velocity which comprises the steps of, generating an analog whose duration is proportional to the length of time required for said vehicle to pass a given detection point and whose amplitude rises above a predetermined base value to a predetermined higher value for a length of time which is variable in proportion to the length of said vehicle, and measuring the average amplitude of said analog which is proportional to vehicle speed.

3. The method of measuring vehicle traffic flow velocity which comprises the steps of, generating an analog for each passing vehicle whose duration is proportional to the length of time required for said vehicle to pass a given detection point and whose amplitude rises above a predetermined base value to a predetermined higher value for a length of time which is variable in accordance with the length of the vehicle passing said given detection point, and storing the average value of the successive analogs thus produced to produce a continuous measurement of vehicular flow velocity.

4. In a system for measuring the velocity of vehicles passing a given detection point the combination comprising, a vehicle presence detector defining a detection zone and demarcating for each detected vehicle the occupancy time of said vehicle in said detection zone, averaging circuit means, input means controlled by said detector for selectively connecting the input of said averaging circuit means to one or the other of two different predetermined voltage sources of respectively different amplitudes during the occupancy time of each detected vehicle but at other times disconnecting said input from both such voltage sources, said input control means being governed by the said vehicle detector to connect said input of said averaging circuit means to the voltage source of higher amplitude for a predetermined time whose length is less than the minimum expected length of time required for a vehicle to pass said detection point and to the voltage source of lower amplitude for the remainder of the occupancy time demarcated by said detector, and means controlled by said averaging circuit means for providing a manifestation representative of the speed of said vehicle.

5. The invention as defined in claim 4 wherein said averaging circuit means comprises at least one series resistor and at least one shunt capacitor and said output means is controlled by the voltage across said shunt capacitor.

6. The invention as defined in claim 5 wherein the time constant for the charging of said capacitor is relatively long so that the voltage across said capacitor can change only to a relatively small degree in response to a single passing vehicle even though its speed varies ma- $L_A$ is the assumed average length of other vehicles of shorter length such as automobiles.

More specifically, for automobiles, a statistical average length may be employed, and the characteristics of the multivibrator 32 and relay SP1 are selected so that the length of time throughout which front contact 40 of relay SP1 remains picked up represents this assumed length for automobiles. When the vehicle passing through the detection zone is a truck, this is detected and results in the picking up of relay SP2 for a predetermined interval after relay SP1 has dropped away. Because of this, front contact 45 of relay SP2 closes and (B+) is applied to the averaging circuit for a longer time.

It has been found practical to detect the passage of longer vehicles in an indirect manner by detecting their greater height. Thus, there is a high degree of correlation between the factors of vehicle length and height so that sufficiently accurate results can be obtained by assuming that a high vehicle is also one of greater length than an ordinary automobile.

As described in connection with FIG. 3, upon the passage of a high vehicle, such as a truck, through the detection zone, the relay TD picks up. When this happens, capacitor 47 which is normally connected through back contact 48 of relay TD to the (B+) terminal and is thus normally fully charged, is then connected across the winding of relay HM through front contact 48. As soon as the relay HM picks up, it is held up through a stick circuit completed from (B+), through back contact 49 of relay HT, front contact 50 of relay HM, and the winding of relay HM. Also, when relay HM picks up, energy is applied from (B+) through front contact 51 of relay HM to wire 52, but a circuit cannot be completed from wire 52 to energize the winding of relay HT until relay SP1 has dropped away and closes its back contact 53. When this happens, relay HT immediately picks up.

Upon the picking up of relay HT, normally discharged capacitor 54, whose left-hand terminal is connected through back contact 55 of relay HT to ground, is then instead connected through this front contact 55 to (B+). This has the effect of placing a positive-going pulse on the control grid of triode tube V5, thereby instantaneously reversing the state of this one-shot multivibrator 60 comprising tubes V4 and V5. This multivibrator has its various time constants so organized that it remains in the abnormal state for a predetermined length of time throughout which relay SP2 connected in the plate circuit of tube V5 is picked up. It will be noted that it is impossible for relay SP2 to pick up until after relay SP1 has dropped away and closes its back contact 53 to permit relay HT to pick up and thereby initiate operation of the multivibrator 60. In other words, it is impossible for the picked up times of the respective relays SP1 and SP2 to overlap each other. However, if relay TD has picked up, relay SP2 will pick up also and will do so very shortly after relay SP1 has dropped away.

The effect of picking up relay SP2 when a vehicle of assumed longer length has passed through the detection zone is shown in FIG. 5 at the right-hand portion thereof. It will be noted that the sum of the two times $t_1$ and $t_2$ is now longer since the time of occupancy of the detection zone is considerably increased. At the same time, since the vehicle has been detected as being of greater than usual height and thus assumed to be a truck of longer length than an ordinary automobile, the time $t_1$ throughout which the (B+) voltage is applied to the averaging circuit is increased. Reference to FIG. 4 clearly shows how this is accomplished. Thus, when back contact 40 of relay SP1 closes, there is a very brief instant during which the averaging is connected through closed back contact 45 of relay SP2 and front contact 22 of relay VR to ground. However, relay SP2 picks up very shortly thereafter so that the voltage applied to the averaging circuit is again abruptly raised to the (B+) level since the averaging circuit is then connected through back contact 40 and through front contact 45 of relay SP2 to (B+). This latter condition persists until relay SP2 drops away, at which time the averaging circuit is connected to ground until relay VR drops away and opens its front contact 22. The longer length of time $t_1$ throughout which the (B+) voltage is applied to the averaging circuit under the conditions just described represents the increased assumed length for the vehicle then in the detection zone.

It will be apparent to one skilled in the art that there are various ways in which the voltage appearing across capacitor 44 may, in effect, be measured so as to ascertain vehicle speed. The manner in which this is accomplished in FIG. 4 is to connect the upper terminal of capacitor 44 to the control grid of a cathode follower tube whose plate is connected to (B+) and whose cathode is connected through a cathode load resistor 56 to the (B−) terminal. A voltage divider is connected from the cathode of this tube and this voltage divider comprises resistors 57 and 58 with the lower terminal of resistor 58 being connected to the variable tap of the potentiometer 59 which is connected between the terminal (B−) and ground. A meter M is connected from the junction of resistors 57 and 58 to ground. Meter M is, therefore, energized to a degree which is directly related to the voltage across capacitor 44. The function of the voltage divider in the cathode circuit of tube V3 is to permit calibration of the meter M so that it will read zero for zero vehicle speed when capacitor 44 is fully discharged.

From the description given it will be apparent that the particular speed information derived from any one vehicle may be in error. One reason why this may occur is that the actual length of such vehicle may vary from the average assumed length of such vehicle. However, the time constants of the averaging circuit comprising capacitor 44 are made relatively long and thus the voltage across capacitor 44 cannot be changed to any great degree merely by the single stepped voltage wave-form obtained from a single passing vehicle. If one passing vehicle has a length greater than the average, it is equally likely that a subsequent vehicle will have a length less than the average assumed length and thus the two errors will cancel out. Because of the long time constants involved, neither vehicle will have had a significant effect upon the voltage level of capacitor 44. For this reason, the meter M connected in the cathode circuit of tube V3 will quite closely read the average or flow velocity of the succession of vehicles passing through the detection zone.

Under some circumstances it is not necessary to segregate vehicles into separate classes according to their length. Thus, on certain highways, trucks are banned. Alternatively, traffic studies may show that a predictable percentage of the vehicles detected are trucks or other longer vehicles so that a statistical average vehicle length may readily be determined. It is then not necessary to vary the length of time during which the reference voltage is applied to the averaging circuit and the vehicle detector of FIG. 2 may be used since it is then not necessary to detect the passage of trucks. In addition, the circuit of FIG. 4 may then be modified by removing therefrom relays TD, HM, HT and SP2 and also multivibrator 60, and back contact 40 of relay SP1 may then be connected to the heel of contact 22 of relay VR.

From the description which has been given, it is clearly also within the scope of this invention to measure the actual length of each vehicle and vary the factor $k_1$ or $k_3$ accordingly. When this is done, the measured average value of the electrical analog so produced is a measure of the speed of the particular vehicle then being monitored rather than flow velocity.

It has been found in practice that the apparatus of FIG. 4 will adequate function to obtain the desired result of measuring traffic flow velocity. Of course, it will terially from that represented by the voltage to which said capacitor is then charged.

7. A system for measuring the flow velocity of vehicles comprising, first means operated to a distinctive condition for a length of time proportional to the time required for each said vehicle to pass a given detection location, second means governed by said first means and controlled to a distinctive condition for only a predetermined interval which is shorter than the time required for a vehicle to pass said detection location even though traveling at the maximum expected speed, a capacitor charging circuit, means controlled by said second means for applying to said capacitor charging circuit a predetermined higher voltage during said predetermined interval and controlled by said first means to apply to said capacitor charging circuit a predetermined lower voltage level during the remainder of said time required for said vehicle to pass said detection location, and means distinctively controlled according to the voltage stored in said capacitor charging circuit for indicating the flow velocity of said vehicles.

8. The invention as defined in claim 7 which further includes a means selectable in accordance with the average length of the vehicles passing said detection location said second means being governed by said selectable means to control the length of said predetermined interval in accordance with said average length of said vehicle.

9. In a vehicle speed measuring system the combination comprising, means controlled by the passage of a vehicle for generating an analog whose amplitude is variable between at least two discrete levels and whose duration is proportional to the time required for said vehicle to pass a given detection location, means governed by said vehicle according to the particular one of at least two different vehicle length categories said vehicle is detected as being within to cause the length of time the analog is at the higher of its said discrete levels to be proportional to the average length of vehicle in the respective class, said analog being governed by said last-named means to be throughout the remainder of its duration at the lower of said discrete levels, and output means governed by the average level of said analog for indicating the speed of said vehicle.

10. The vehicle speed measuring system of claim 9 wherein said analog is a direct-current electrical signal.

11. The vehicle speed measuring system of claim 10 wherein said output means comprises at least one series resistor and shunt capacitor, and means including a meter energized in accordance with the voltage across said capacitor.

12. In a vehicle speed detection system the combination comprising, signal averaging means, first vehicle detector means, first signal control means governed by said first vehicle detector means upon the passage of a vehicle for applying to said signal averaging means a first signal having a first predetermined amplitude for a first predetermined duration, second vehicle detector means governed by the passage of a vehicle known to be in a class having a length substantially longer than the average automobile, second signal control means governed by said second vehicle detector means for applying to said signal averaging means non-concurrently with said first signal a second signal having said first predetermined amplitude for a second predetermined duration, said second predetermined duration being so selected that the sum of said first and second predetermined intervals bears the same ratio to said first predetermined interval that the average length of vehicle in said class bears to the length of an average automobile, and circuit means governed by said first vehicle detector means for applying to said signal averaging means a signal having a predetermined second amplitude lower than said first predetermined amplitude for a length of time causing said signal to have an over-all duration at both said first and second amplitudes which is proportional to the length of time required for said vehicle to pass said detector location.

13. The system defined in claim 12 wherein said first signal control means includes a first monostable multivibrator which is operated to its non-stable state by said first vehicle detector means for a time interval corresponding to said first predetermined duration and said second signal control means includes a second monostable multivibrator which is operated to its non-stable state by said second vehicle detector means substantially at the time said first multivibrator is restored to its stable state and for a time interval corresponding to said second predetermined duration.

14. The system defined in claim 13 wherein said first signal control means also includes a first relay operated from its normal condition for said first predetermined duration by said first multivibrator, said second signal control means includes a second relay operated from its normal condition for said second predetermined duration by said second multivibrator, said circuit means includes a third relay operated from its normal condition for a time interval proportional to the time required for said vehicle to pass said detector location, said signal arranging means being governed by said first, second and third relays to receive said signals of said first predetermined amplitude throughout the time either of said first or second relays is operated from its normal condition, to receive said signal of said second lower amplitude throughout the time that only said third relay is operated from its normal condition and to receive no signal when all of said relays are in their normal conditions.

15. The method of measuring vehicular flow velocity which comprises the steps of:
(A) measuring the time required for each vehicle to pass a given point on the highway;
(B) determining the length, at least on an average, of vehicles passing said point;
(C) algebraically adding, for each vehicle passing said given point, to an existing manifestation of flow velocity, an amount which is substantially proportional to the difference between
(1) the length of said vehicle and
(2) the product of:
(a) the speed equivalent of the then-stored flow velocity and
(b) the time measured according to step (A); and
(D) measuring the magnitude of said flow velocity manifestation.

16. Apparatus for measuring traffic flow velocity comprising in combination, vehicle responsive means defining a detection zone at a traffic monitoring location and demarcating the occupancy time of each vehicle in said detection zone, means providing a manifestation representative of the length at least on a statistical average of vehicles passing through said zone, a storage capacitor for storing electrical charge in an amount proportional to flow velocity, means governed by said vehicle responsive means for algebraically adding electrical charge to said capacitor in response to each detected vehicle by an amount substantially proportional to the difference between the
(A) then-existing vehicle length manifestation and
(B) the product of:
(1) the flow velocity equivalent of the then-stored capacitor charge and
(2) the said occupancy time,
and means responsive to the amount of charge stored in said capacitor.

17. Apparatus for measuring traffic flow velocity comprising in combination, vehicle-responsive means at a monitoring location for demarcating the time of occupancy of each vehicle in a detection zone defined by said responsive means, means for providing a manifestation of the lengths of vehicles traversing said detection zone; storage means for storing a signal representative of flow velocity; means governed by said vehicle-responsive means for algebraically adding to the signal currently stored in said storage means, and in response to each vehicle traversing said detection zone, an amount of signal proportional to the difference between the (A) then-existing vehicle length manifestation and
(B) the time integral of the instantaneous flow velocity value represented by the signal then stored in said storage means and with the integration taking place over the duration of said occupancy time, and means responsive to the magnitude of signal stored in said storage means.

18. The apparatus of claim 17 in which said means for providing a manifestation of vehicle length includes vehicle height responsive means selectively controlled in accordance with the height of each vehicle traversing said detection zone for governing the value of the vehicle length manifestation in accordance with the known statistical relationship between vehicle height and vehicle length.

19. Apparatus for measuring vehicular flow velocity comprising in combination, means responsive to the presence of a vehicle in a defined detection zone along a highway or the like for demarcating the occupancy of time of said vehicle in said detection zone; means selectable in accordance with the lengths of vehicles passing through said detection zone for providing a manifestation of vehicle length, storage means for storing a parameter whose magnitude is proportional to flow velocity, means governed by said selectable means for adding to the stored parameter in response to each vehicle detected at a rate proportional to the difference between the instantaneous magnitude of the stored parameter and a preselected higher reference value for said parameter and over a selectable time interval substantially governed by the then-existing value of said vehicle length manifestation, means governed by said vehicle responsive means for subtracting in response to each detected vehicle from the stored parameter at a rate proportional to the existing instantaneous magnitude of the stored parameter and over an interval substantially equalling said detection zone occupancy time less said selectable time period, and means responsive to the magnitude of the parameter stored in said storage means.

20. Apparatus for measuring vehicular flow velocity comprising in combination, means responsive to the presence of a vehicle in a defined detection zone along a highway or the like for demarcating the occupancy time of said vehicle in said detection zone, means selectable in accordance with the lengths of vehicles passing through said detection zone for providing a manifestation of vehicle length, storage means for storing a parameter whose magnitude is proportional to flow velocity, means governed by said selectable means for adding to the stored parameter in response to each vehicle detected at a rate proportional to the difference between the instantaneous magnitude of the stored parameter and a preselected higher reference value for said parameter and over a selectable time interval substantially governed by the then-existing value of said vehicle length manifestation, means governed by said vehicle responsive means for subtracting from the stored parameter, in response to each detected vehicle, an amount substantially proportional to the time integral of the magnitude of the stored parameter over an interval substantially equalling said detection zone occupancy time less said selectable time period, and means responsive to the magnitude of the parameter stored in said storage means.

21. The apparatus of claim 20 in which said selectable means includes means responsive to the heights of vehicles traversing said detection zone for governing the value of the vehicle length manifestation in accordance with the known statistical relationship between vehicle height and vehicle length.

22. The method of measuring vehicular flow velocity comprising the steps of:

(A) measuring the time required for each vehicle to pass a given point on the highway;
(B) determining the length, at least on an average, of the vehicles to be measured;
(C) adding, for each vehicle passing said given point, to an existing manifestation of flow velocity, at a rate proportional to the difference between the currently-existing magnitude of said manifestation and a predetermined higher reference value for said manifestation and over a selectable time period selected in accordance with the vehicle length determined according to step (B);
(D) subtracting for each vehicle passing said given point, from the existing manifestation of flow velocity, at a rate proportional to the magnitude of the currently-existing manifestation and over a period of time substantially equally the time period measured in step (A) less the selectable time period of step (C) throughout which addition to the stored parameter is being effected, and
(E) measuring the magnitude of said flow velocity manifestation.

23. Apparatus for measuring vehicular flow velocity comprising in combination, means responsive to the presence of a vehicle in a defined detection zone along a highway or the like for demarcating the occupancy time of said vehicle in said detection zone, means selectable in accordance with the lengths of vehicles passing through said detection zone for establishing for each detected vehicle at least an approximate manifestation of vehicle length, storage means for storing a parameter whose magnitude is representative of flow velocity, means responsive to each passing vehicle for algebraically adding to the then-existing value of the flow velocity parameter stored in said storage means in accordance with the difference between said then-existing value of said flow velocity and an indirectly measured velocity value for said passing vehicle, and means responsive jointly to said vehicle length manifestation provided by said selectable means and to said occupancy time demarcated by said presence responsive means for providing for each said passing vehicle said indirectly measured velocity value.

24. The method of measuring the flow velocity of vehicles in a stream of traffic comprising the steps of, generating an analog whose duration is proportional to the length of time required for said vehicle to pass a given detection point and whose amplitude rises above a predetermined base value to a predetermined higher value only for a second predetermined length of time which is less than the shortest expected duration of said analog, and measuring the average amplitude of successive of said analogs to provide a continuous measurement of flow velocity.

25. Apparatus for measuring vehicular flow velocity comprising in combination, means responsive to the presence of a vehicle in a defined detection zone along a highway or the like for demarcating the occupancy time of said vehicle in said detection zone, signal accumulating means, means for adding to the signal stored in said signal accumulating means for each vehicle detected by said vehicle responsive means an amount of signal inversely proportional to the value of the signal then stored in said signal accumulating means and for also subtracting from said signal stored in said signal accumulating means an amount of signal substantially proportional to the occupancy time of each said vehicle in said detection zone and proportional also to the present value of said signal, and means for time-averaging the magnitude of the signal in said signal accumulating means for providing a resulting signal whose magnitude is representative of flow velocity.

26. Apparatus for measuring vehicle flow velocity comprising in combination, means responsive to the presence of a vehicle in a defined detection zone along a highway or the like for demarcating the occupancy time of said vehicle in said detection zone, signal accumulating means, means responsive to each vehicle detected by said vehicle responsive means for adding to said signal stored in said signal accumulating means for each vehicle detected an amount of signal inversely proportional to the value of the signal in said signal accumulating means and for also subtracting from said signal in said signal accumulating means an amount of signal proportional in part to the occupancy time of each said vehicle in said detection zone and in part to the value of said signal, output means operatively connected to said signal accumulating means and responsive to the value of the signal stored therein for producing an output manifestation representative of flow velocity, and means adjustable in accordance with the average length of vehicles which are detected by said vehicle responsive means and whose flow velocity is being measured for controlling the relationship between said predetermined amount of signal added to said signal accumulating means for each detected vehicle and the flow velocity manifestation produced by said output means.

27. The method of measuring vehicular flow velocity comprising the steps of:
  (A) measuring the time required for each vehicle to pass a given point on the highway;
  (B) adding, for each vehicle passing said given point, to an existing manifestation of flow velocity, at a rate proportional to the difference between the currently-existing magnitude of said manifestation and a predetermined higher reference value for said manifestation and over a predetermined, fixed time period;
  (C) subtracting, for each vehicle passing said given point, from the existing manifestation of flow velocity, at a rate proportional to the magnitude of the currently-existing manifestation and over a period of time substantially equally the time period measured in step (A) less the predetermined time period of step (B) throughout which addition to the stored parameter is being effected, and
  (D) measuring the magnitude of said flow velocity manifestation.

28. Apparatus for measuring vehicular flow velocity comprising in combination, means responsive to the presence of each passing vehicle within a defined detection zone along a highway for demarcating the occupancy time of said vehicle in said detection zone, storage means for storing a parameter whose magnitude is representative of flow velocity, means responsive to each vehicle for algebraically adding to the then-existing value of the flow velocity parameter stored in said storage means in accordance with the difference between said then-existing value of said flow velocity and an indirectly measured velocity value for said passing vehicle, and means responsive to said occupancy time demarcated by said presence responsive means for providing for each passing vehicle said indirectly measured velocity value.

No references cited.

MALCOLM A. MORRISON, *Primary Examiner.*

K. W. DOBYNS, *Assistant Examiner.*